United States Patent [19]

Nonaka

[11] Patent Number: 5,722,639
[45] Date of Patent: Mar. 3, 1998

[54] MULTISTAGE WEDGE-SHAPED JACK APPARATUS

[75] Inventor: Haluo Nonaka, Osaka, Japan

[73] Assignee: Matsuo Engineering Co., Ltd., Osaka, Japan

[21] Appl. No.: 652,917

[22] Filed: May 24, 1996

[30] Foreign Application Priority Data

May 26, 1995 [JP] Japan ................................. 7-127952

[51] Int. Cl.$^6$ ................................................. B24B 41/06
[52] U.S. Cl. ................................................. 254/104
[58] Field of Search .................... 254/42, 104; 269/234; 248/188.1, 188.2, 188.3, 188.4, 412, 420

[56] References Cited

U.S. PATENT DOCUMENTS

| 2,164,615 | 7/1939 | Mafera | 254/104 |
| 3,239,218 | 3/1966 | Reeves | 254/104 |
| 4,944,492 | 7/1990 | Nonaka | 254/109 |
| 5,566,414 | 10/1996 | Nonaka | 254/104 |

FOREIGN PATENT DOCUMENTS

| 678451 | 9/1991 | Switzerland | 248/188.4 |

*Primary Examiner*—Robert C. Watson
*Assistant Examiner*—Thomas W. Lynch
*Attorney, Agent, or Firm*—Armstrong, Westerman, Hattori, McLeland & Naughton

[57] ABSTRACT

A multistage wedge-shaped jack apparatus is provided for jacking up and maintaining a heavy structure for mounting and replacing bearing units interposed between the heavy structure and a lower base while considerably increasing the jack amount without increasing the overall length of the apparatus. A wedge-shaped drive member (1) and a wedge-shaped pressure receiving member (2) are laminated on a base plate (3) and brought into contact with each other with the respective slant surfaces (11) and (21). A push/pull drive device (6) is provided in cooperation with a reactive force receiving device (5) for limiting a movement of the wedge-shaped pressure receiving member. A single or a plurality of auxiliary wedge-shaped members (7) are provided to the wedge-shaped drive member to be detachably coupled with each other in order. Each auxiliary wedge-shaped member has a shorter length than a stroke length of the push/pull drive device and has a slant surface (11) at the same slant angle as that of the slant surface of the wedge-shaped drive member. The slant surfaces are continuous between the wedge-shaped drive member or the front stage wedge-shaped member and the rear stage wedge-shaped member. A drive rod (71) of the push/pull drive device and the wedge-shaped drive member/each auxiliary wedge-shaped member are detachably coupled with each other. A temporary engagement device (8) is provided for limiting a movement of the wedge-shaped drive member and the auxiliary wedge-shaped member after the jack-up operation.

11 Claims, 11 Drawing Sheets

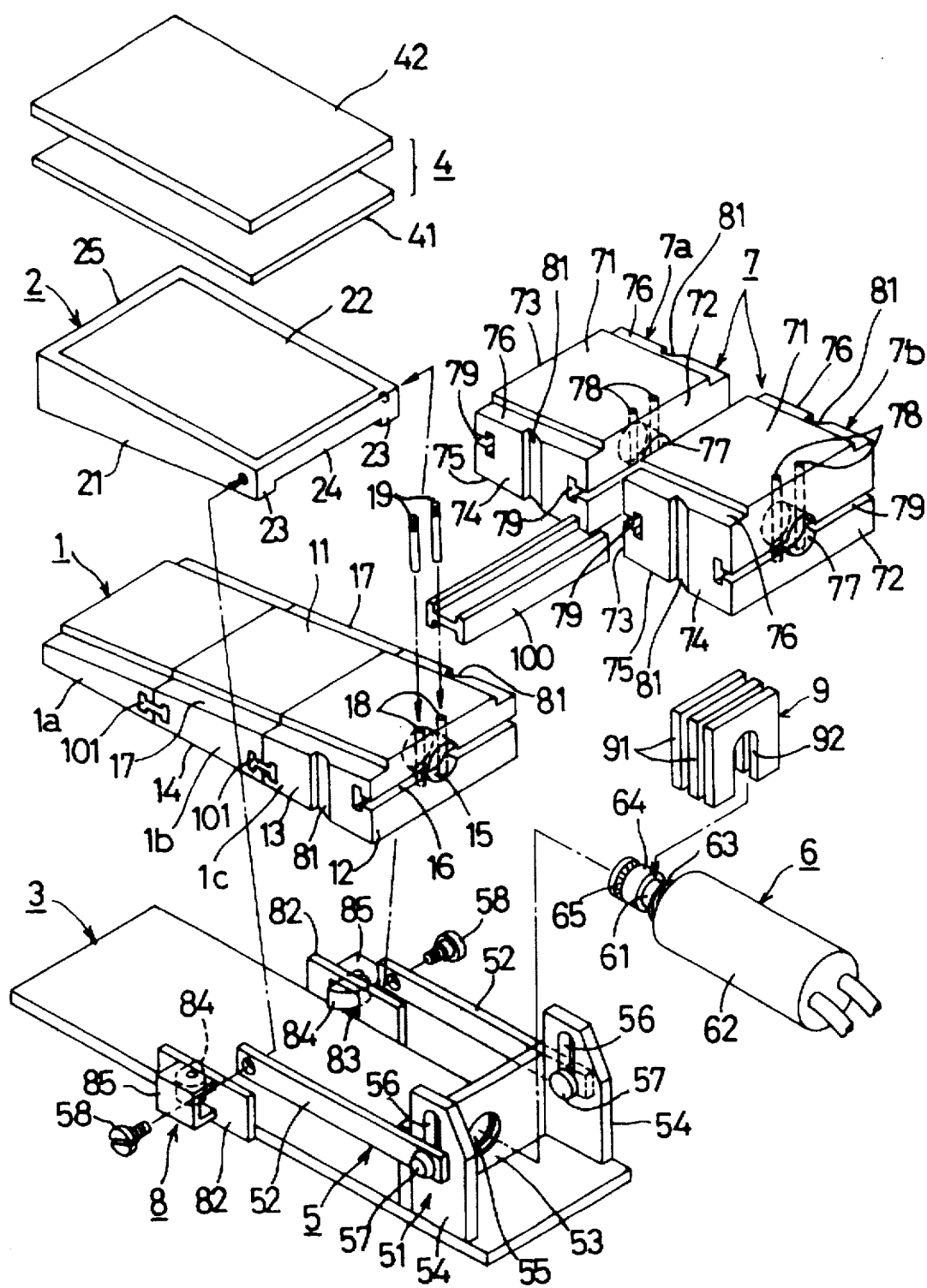
(Fig. 1)

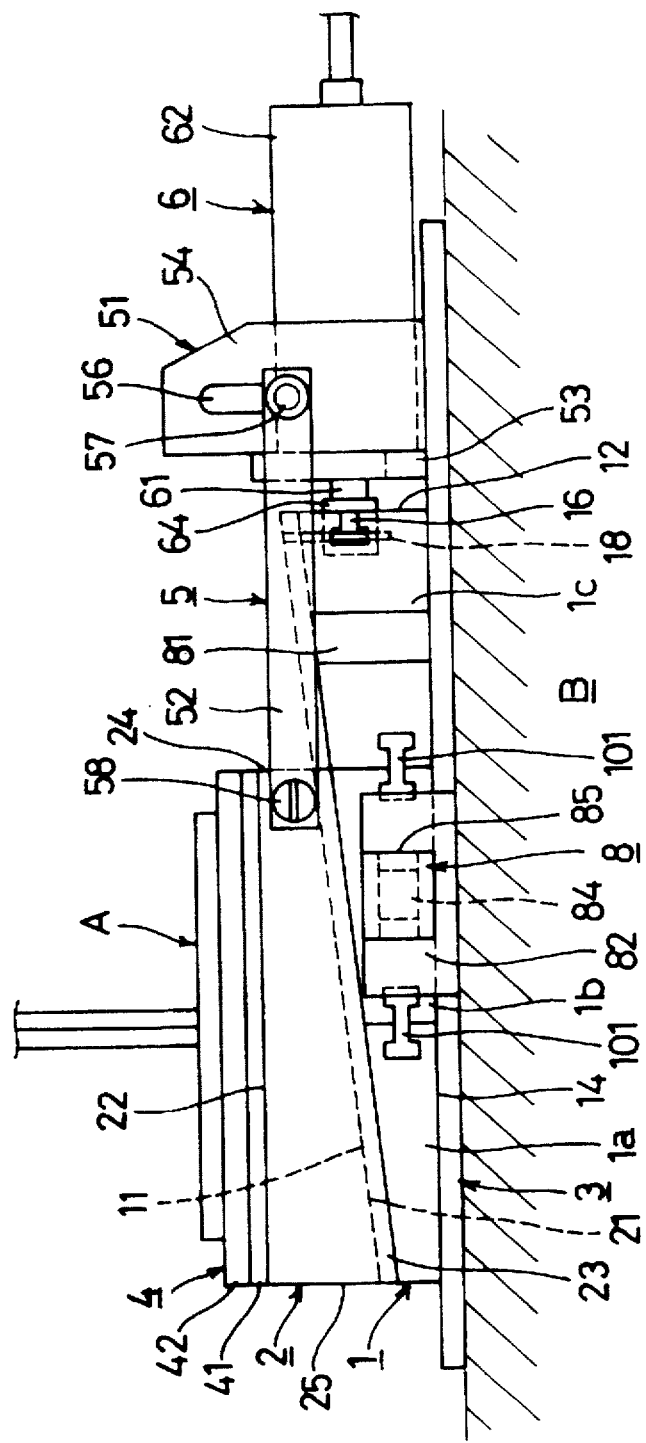
(Fig. 2)

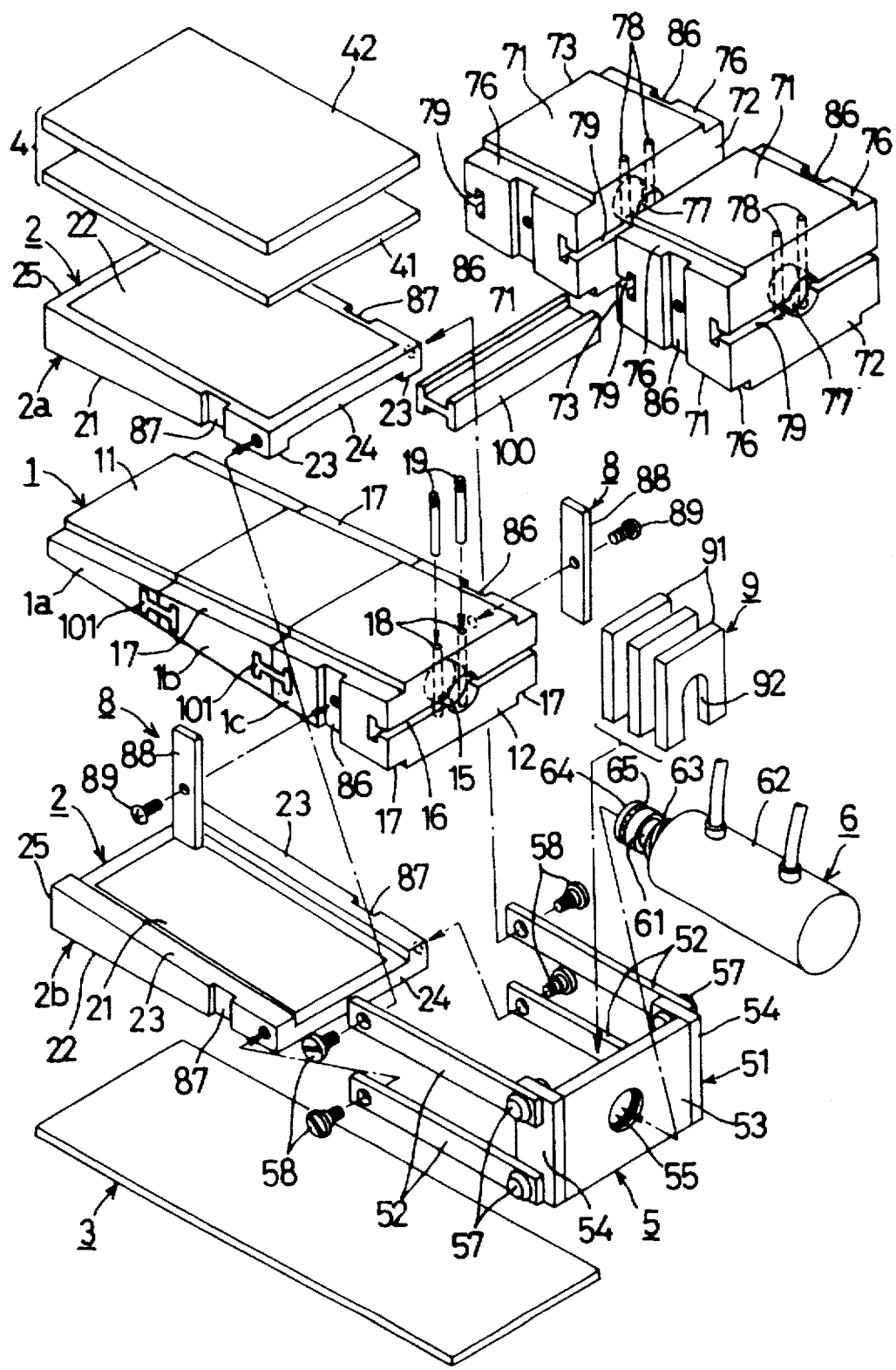
(Fig. 3)

(Fig. 4)
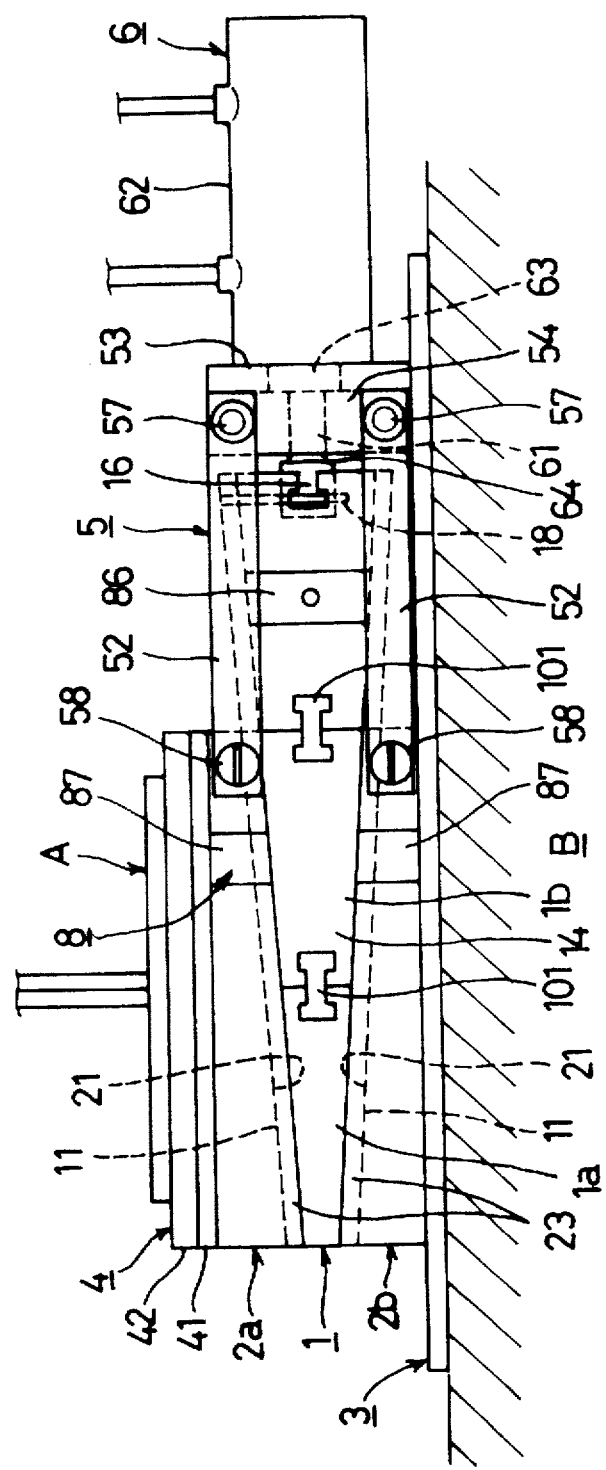

(Fig. 8)
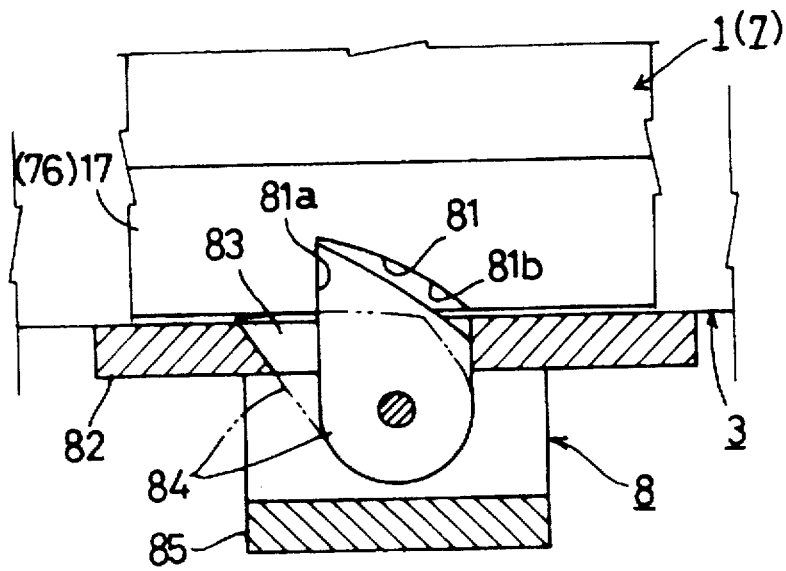
(Fig. 9)
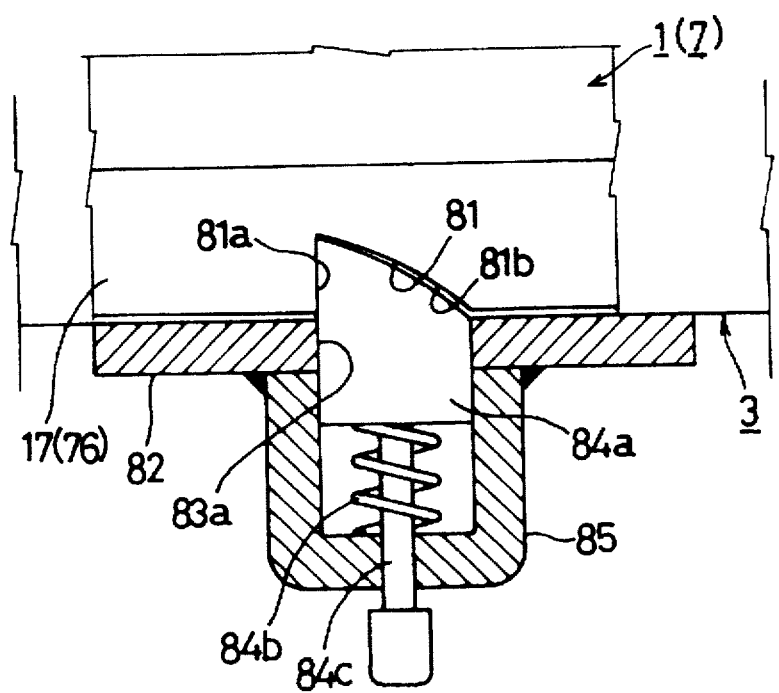

(Fig. 10)
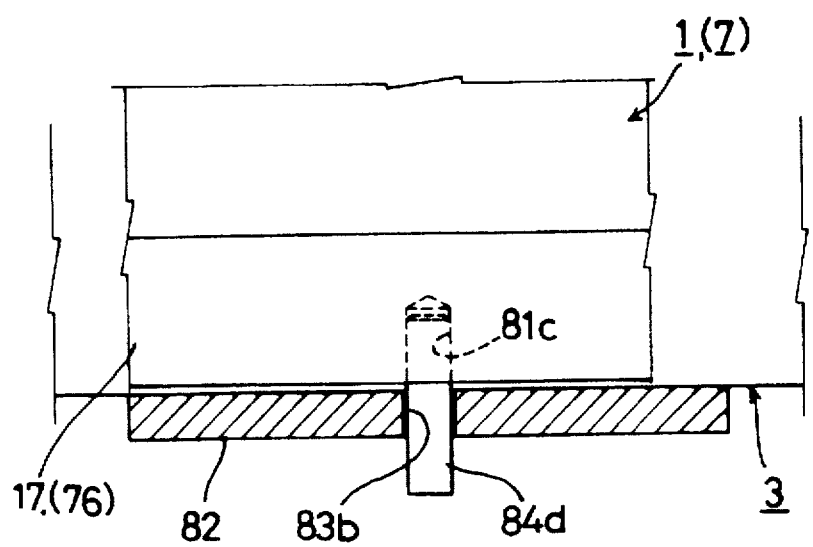

MULTISTAGE WEDGE-SHAPED JACK APPARATUS

BACKGROUND OF THE INVENTION

1. Field of the Invention

The present invention relates to a multistage wedge-shaped jack apparatus for lifting and supporting a structure in, for example, mounting bearing units to be interposed between heavy structures such as bridges and lower working space, and performing the replacement work. More particularly, the present invention relates to a multistage wedge-shaped jack apparatus that may considerably increase an amount of jack up without reducing a jack amplifying rate.

2. Description of the Related Art

As shown in FIG. 11, there are bearing units C in place between a heavy structure (hereinafter simply referred to as a structure) A such as a bridge girder supported by bearings for bridges or express ways and a lower support B for supporting the structure A, for positively transmitting, to the lower support B, vertical loads such as a dead load, an active load and the like of the structure A, and for enabling the horizontal movement of the structure A in consideration of the length of the horizontal movement due to expansion of the structure A caused by changes of temperature, vibrations or the like. In many cases, the bearing units which already have been laid (which units will be hereinafter referred to as old bearing units C) are subjected to strains due to loads, vibrations and the like from the structure A and to damages due to the bending moment since the bearing units have been used long from the building time of the structure A. Also, in many cases, the old bearing units are damaged caused by corrosion due to rain water and sand dust, resulting in the reduction or suppression in the weight absorbing function. Therefore, the requirements to replace the damaged old bearing units to new ones arise one after another.

A conventional replacement method is as follows: As shown in FIG. 12, plate members made of metal or saddle made of steel are piled up to substantially the same height as that of the old bearing units C in the vicinity of the old bearing units C to form a temporary bearing member D. A hydraulic jack E which may jack up with supporting the structure A (this operation will be hereinafter referred to as "jack") is installed in the vicinity of the bearing units C. Then, the jack up is effected by several millimeters to 10 mm to the condition that the old bearing units C are separated from the structure A. The structure A is temporarily supported by a temporary support tool F that is composed of piled metal plates or the like. Under this condition, the old bearing units C are removed, and the new bearing units are installed. Thereafter, the structure A is further jacked up once beyond the temporary bearing position by the above-described hydraulic jack E and the temporary support tool F is removed. Then, the structure is jacked down. The replacement work for the bearing units are thus performed. Also, in addition to the above-described replacement method for the bearing units C, a bracket method, a special base method and the like have been conventionally proposed depending upon the mounting condition of the bearing units C.

According to these methods, it is impossible to smoothly jack up the heavy structure such as a bridge and an additional installation work for installing the temporary bearing members D and the like for jacking up is required, whereby since it takes a long working period, it causes not only to increase the repair cost but also to impose loads to the workers with a danger to induce an accident. Accordingly, the present inventors invented a jacking method for jacking the above-described structure A in safety and with ease and a wedge-shaped jack for use in such a method, granted in Japanese Examined Patent Publication No. Hei. 4-54002 and also matured into U.S. Pat. No. 4,944,492. Also, these inventions are now practiced. More specifically, as shown in FIGS. 13(I) to 13(III), a wedge-shaped drive member 201 having slant surfaces on its upper and lower surfaces is interposed between two upper and lower wedge-shaped pressure receiving members 202 and 203 in the vicinity of the old bearing unit C in relation with a pushing/retracting means 200, and the above-described wedge-shaped drive member 201 is pushed to a longitudinal direction by a hydraulic jack 204. As a result, as shown in FIG. 13(II), the above-described wedge-shaped drive member 201 is moved upwardly in accordance with the sliding movement relative to the slant surface of the lower wedge-shaped bearing member 203. At the same time, the upper wedge-shaped pressure receiving member 202 is moved upwardly in accordance with the sliding movement relative to the slant surface of the wedge-shaped drive member 201 to thereby jack up the structure A upwardly. Then, in order to maintain this condition, a suitable number of stop members 207 having a horseshoe-shape are inserted from above while embracing a drive rod 206 of the hydraulic jack 204 in the space between the pressure receiving plate 205 of the hydraulic jack 204 and the above-described wedge-shaped drive member 201. As a result, the space between a reactive force receiving plate 205 and the wedge-shaped drive member 201 is filled to once limit the movement of the wedge-shaped drive member 201. In the meantime, the repair or replacement for the old bearing unit C is carried out and the new bearing unit (not shown) is installed. After the completion of this work, as shown in FIG. 13(III), the above-described wedge-shaped drive member 201 is pulled away in the longitudinal direction, and the structure A is jacked down for completing the repair or replacement. Incidentally, during the repair and replacement work for the old bearing unit C, various variable loads are applied to the structure A due to the passage of vehicles, and the shift and vibration are generated. The shift and vibration are however absorbed by a damper (not shown) and a slide plate 208 disposed between the upper wedge-shaped pressure receiving member 202 and the lower surface of the structure A. According to this method and the apparatus, for a short period of time and with ease, it becomes possible to perform the repair or replacement work for the old bearing unit C, which had been impossible or dangerous. This is highly appreciated in various engineering and construction fields.

According to the jacking method and apparatus and further to a subsequent improvement in the apparatus, it is possible to attain the object to smoothly jack up with ease the structure such as a bridge for the repair and replacement work for the old bearing units in a normal condition. However, in the circumstances that the old bearing units are damaged so that the bridge girders are more lowered than expected, or the bearing units themselves are removed and fallen down so that the bridge is directly laid on the support legs due to the vibrations or quakes with unexpected vertical swings like a Hanshin Earthquake Disaster of a seismic intensity of seven, it would be impossible to cope with the accidents with the conventional wedge-shaped jack apparatus. Namely, in the conventional wedge-shaped jack apparatus, the height through which the structure may be jacked is 10 mm at best. However, in fact, the jack up that is much larger than 10 mm is required. More specifically, in order to maintain the jack amplification rate at about three or four times with the conventional wedge-shaped jack apparatus, a gradient of the slant surface is set at about 8% in view of the static frictional coefficient of the slant surfaces. In order to obtain the jack up of 10 mm with this gradient, a 125 mm stroke of the wedge-shaped drive member is required, and a hydraulic jack (i.e., cylinder) having the stroke of 150 mm is practically used. Therefore, in order to obtain the further jack amount without reducing the jack amplification rate, it is considered that a large size hydraulic jack is used and the wedge-shaped drive member is elongated to increase the stroke. However, the hydraulic jack, the wedge-shaped drive member, and their peripheral equipment become large in size to increase the cost. In addition, the weight of the apparatus is increased, thereby making it difficult to handle the apparatus. Moreover, even if the stoke is doubled, the amount of the jack is just twice larger than ever. This never leads to the basic countermeasure.

SUMMARY OF THE INVENTION

Accordingly, the present inventors have found the countermeasure through vigorous studies as follows. In the jack-up operation, a plurality of auxiliary wedge-shaped members are coupled with each other in order at the thick end face of a wedge-shaped drive member. The wedge-shaped drive member or the front stage auxiliary wedge-shaped member which are not necessary for the operation is removed. In the jack-down operation, the front stage auxiliary wedge-shaped member or the final wedge-shaped drive member is coupled in order at the thin end face side of the rear stage auxiliary wedge-shaped member. The rear stage auxiliary wedge-shaped member which are not necessary for the operation is removed. A reactive force receiving means is devised. Then, the above-described tasks may be solved at once. The multistage wedge-shaped jack apparatus has been developed so that it is possible to jack up, smoothly in safety, the heavy weight structure such as a bridge girder in the same manner as in the conventional jack apparatus and also to considerably increase the jack amount of about 50 to 100 mm without increasing the overall length of the apparatus.

According to the present invention, there is provided a multistage wedge-shaped jack apparatus wherein a longitudinally movable wedge-shaped drive member having a slant surface at least on an upper side and a wedge-shaped pressure receiving member having a slant surface at the same slant angle as that of the slant surface of the drive member and slidable on the slant surface of the wedge-shaped drive member, on one of its upper and lower sides, and having a horizontal surface on the other of its upper and lower side are laminated one on another on a base plate with the respective slant surfaces being in contact with each other; a plate-like pedal is laminated on the lamination; and the thick end face side of the wedge-shaped drive member is pushed or pulled by a push/pull drive means provided in cooperation with a reactive force receiving means for limiting a movement of the wedge-shaped pressure receiving member for jacking up and down a structure laid on the plate-like pedal, characterized in that: a single or a plurality of auxiliary wedge-shaped members are detachably coupled with each other in order at the thick end face side of the wedge-shaped drive member; each auxiliary wedge-shaped member has a shorter length than that of the stroke length of the push/pull drive means, and has a slant surface having the same slant angle as that of the slant surface of the wedge-shaped drive member; the slant surfaces of the wedge-shaped drive member or a front stage auxiliary wedge-shaped member and a rear stage auxiliary wedge-shaped member are continuous at the thick end face of the wedge-shaped drive member or the front stage auxiliary wedge-shaped member and the thin end face of the rear stage auxiliary wedge-shaped member; further, a tip end of a drive rod of the push/pull drive means and the thick end face of the wedge-shaped drive member and each wedge-shaped member are detachably coupled with each other; and a temporary engagement means is provided for limiting a movement of the wedge-shaped drive member and the auxiliary wedge-shaped members in engagement with side walls of the wedge-shaped drive member and the auxiliary wedge-shaped members after a jack-up operation through a predetermined height.

More particularly, the wedge-shaped drive member and the auxiliary wedge shaped members have the slant surfaces on the upper side and horizontal surfaces on the lower side, and the wedge-shaped pressure receiving member located on the upper side has the slant surface on the lower side. In this case, it is preferable that the reactive force receiving means is provided for coupling, through links, both side portions of pressure receiving members to which a body portion of the push/pull drive means is fixed and both side portions of the wedge-shaped pressure receiving member at positions close to the thin end face thereof, and the reactive force receiving member is fixed to the base plate.

Also, the wedge-shaped drive member and the auxiliary wedge shaped members have the slant surfaces on the upper and lower sides, the wedge-shaped pressure receiving member located on the lower side has the slant surface on the upper side, and the wedge-shaped pressure receiving member located on the upper side has the slant surface on the lower side. In this case, it is preferable that the reactive force receiving means is provided for coupling, through links, both side portions of pressure receiving members to which a body portion of the push/pull drive means is fixed and both side portions of the upper and lower wedge-shaped pressure receiving members at positions close to the thin end faces thereof.

Then, it is practical that the wedge-shaped drive member and the auxiliary wedge-shaped member or the front stage and rear stage auxiliary wedge-shaped members are coupled with each other by inserting an H-shaped spill member into connection grooves having a T-shape in cross section and formed at the end faces of the wedge-shaped drive member and the auxiliary wedge-shaped member or the front stage and rear stage auxiliary wedge-shaped members. Guide linear recesses are formed along both sides of one of the slant surfaces that are slidingly moved relative to each other, and guide linear projections which are slidably contact with the guide linear recesses are formed on the other of the slant surfaces. A single or a plurality of stop plates are inserted between the reactive force receiving member and the thick end face of the wedge-shaped drive member or the auxiliary wedge-shaped member.

Also, it is more practical that the wedge-shaped drive member is divided into a plurality of segments in a longitudinal direction, and the segments are detachably coupled with each other.

In the multistage wedge-shaped jack apparatus having the structure as described above, the slant surface of the wedge-shaped drive member is brought into contact with the slant surface of the wedge-shaped pressure receiving member to be laminated on the base plate. At the same time, the plate-like pedal is laminated thereon. The thick end face side of the wedge-shaped drive member is pushed or pulled by the push/pull means provided in cooperation with the reactive force receiving means for limiting the movement of the wedge-shaped pressure receiving member. Therefore, the structure laid on the plate-like pedal is jacked up and down. In the case where the structure is jacked up, the thick end face side of the above-described wedge-shaped drive member is pushed by the tip end of the drive rod of the push/pull means, and the wedge-shaped drive member is slidingly moved relative to the wedge-shaped drive member to thereby jack up the upper wedge-shaped pressure receiving member and the plate-like pedal. Then, in the case where the structure is to be further jacked up, the engagement means is engaged with each side wall of the wedge-shaped drive member kept in this condition for limiting the movement thereof. Thereafter, the drive rod is withdrawn. The auxiliary wedge-shaped member which is shorter than the stroke length of the above-described push/pull drive means and which has the slant surface having the same slant angle as that of the slant surface of the wedge-shaped drive member is detachably coupled with the thick end face side of the wedge-shaped drive member between the wedge-shaped drive member and the drive rod so that the slant surfaces are continuous at the thick end face of the wedge-shaped drive member and at the thin end face of the auxiliary wedge-shaped member. Thereafter, the drive rod pushes the thick end face side of the auxiliary wedge-shaped member so that the wedge-shaped drive member is pushed with the sliding movement between the slant surface of the auxiliary wedge-shaped member and the slant surface of the wedge-shaped pressure receiving member to thereby jack up the plate-like pedal and the upper wedge-shaped pressure receiving member. In order to further jack up the structure under this condition, the side surfaces of the auxiliary wedge-shaped member are engaged with the engagement means to limit the movement. Thereafter, the drive rod is drawn and the thin end face side of the rear stage auxiliary wedge-shaped member is detachably coupled in the same manner with the thick end face side of the auxiliary wedge-shaped member between the auxiliary wedge-shape member and the drive rod. The thick end face of the rear stage auxiliary wedge-shaped member is pushed by the drive rod for the further jack-up operation. After that, the structure is jacked up stepwise by coupling the rear stage auxiliary wedge-shaped members in order. Finally, the large jack amount may be obtained. Then, the wedge-shaped drive member and the auxiliary wedge-shaped members which have passed through the thick end face side of the wedge-shaped pressure receiving member are removed in order by separating them at the connection portions. Thus, the overall length of the apparatus may be suppressed.

Also, in the case where the structure which has been jacked up as described above is to be jacked down, the tip end of the drive rod of the push/pull drive means is coupled with the thick end face side of the final stage auxiliary wedge-shaped member. At the same time, under the condition that the thick end face of the one stage previous auxiliary wedge-shaped member is coupled to the thin end face of the front stage auxiliary wedge-shaped member that appears at the thick end face side of the wedge-shaped pressure receiving member, the drive rod is drawn to remove the final stage auxiliary wedge-shaped member. At the same time, the auxiliary wedge-shaped member connected on the front stage side is drawn below the wedge-shaped pressure receiving member, and the wedge-shaped pressure receiving member and the plate-like pedal are lowered. Then, this operation is performed in order and finally, the wedge-shaped drive member is coupled for the original condition.

Also, in case of the wedge-shaped drive member and the auxiliary wedge-shaped member having the slant surfaces on the upper side and the horizontal surface on the lower side, the horizontal surface of the wedge-shaped drive member is slidingly moved along and on the base plate. The working line of the drive force of the push/pull drive means is not changed up and down. Accordingly, it is possible to fix the push/pull drive means to the base plate, and the structure of the reactive force receiving means may be simplified. The maintenance of the push/pull drive means is stable. Therefore, in this case, the reactive force receiving means is sufficient if the both side portions of the reactive force receiving member to which the body portion of the push/pull drive means is fixed is coupled, through links, with the both side portions of the upper wedge-shaped pressure receiving member at the position close to the thin end face thereof by the reactive force rods, and the reactive force receiving member is fixed to the base plate.

On the other hand, in case of the wedge-shaped drive member and the auxiliary wedge-shaped member having the slant surface on the upper and lower sides, the lower wedge-shaped pressure receiving member having the slant surface on the upper side, and the upper-shaped pressure receiving member having the slant surface on the lower side, the jack amount may be doubled in comparison with the case described above. On the other hand, since the wedge-shaped drive member is fluctuated up and down relative to the lower wedge-shaped pressure receiving member, in order to transmit the drive force of the push/pull drive means always in the stable manner to the wedge-shaped drive member, it is necessary to use the reactive force receiving means that fluctuate the working line of the drive force of the push/pull drive means up and down relative to the base plate in accordance with the up and down movement of the wedge-shaped drive member. Accordingly, it is preferable that both side portions of the reactive receiving member to which the body portion of the push/pull drive means is fixed is coupled through links, i.e., reactive force receiving rods with the both side portions of the upper and lower wedge-shaped pressure receiving members at the thin end face sides.

In the case where the wedge-shaped drive member and the auxiliary wedge-shaped member or the front stage and the rear stage auxiliary wedge-shaped members are coupled with each other by inserting the H-shaped spill member from the side into the connection grooves having the T-shape in cross section and formed at the end faces, it is possible to obtain a strong connection against the push/pull force, and to facilitate the detachment/attachment. Also, in this case, even if the space between the lower base and the structure is small, it is possible to readily attain the separation work.

Also, in the case where the guide linear recesses are formed along both sides of one of the slant surfaces which are slidingly moved relative to each other, and the guide linear projections for engaging with the guide linear recesses are formed on the other of the slant surfaces, the wedge-shaped drive member or the auxiliary wedge-shaped member and the wedge-shaped pressure receiving member are not displaced in the lateral direction, and it is possible to stably slidingly move the components only in the predetermined longitudinal direction.

Also, if a single or a plurality of stop plates are inserted between the reactive force receiving member and the thick end face of the wedge-shaped drive member or the auxiliary wedge-shaped member, it is possible to maintain the state in a stable manner after the structure has been jacked.

Furthermore, if the wedge-shaped drive member is devided into a plurality of segments in a longitudinal direction, and the segments are detachably coupled with each other, it is possible to remove the unnecessary parts for the jack-up and -down working. Accordingly, it is possible to suppress the increase of the apparatus even if the jack amount is considerably increased by using the single or plural auxiliary wedge-shaped members.

BRIEF DESCRIPTION OF THE DRAWINGS

In the accompanying drawings:

FIG. 1 is an exploded perspective view showing a multistage wedge-shaped jack apparatus according to a first embodiment of the invention;

FIG. 2 is a schematic side elevational view showing the assembled state of the apparatus shown in FIG. 1;

FIG. 3 is an exploded perspective view showing a multistage wedge-shaped jack apparatus according to a second embodiment of the invention;

FIG. 4 is a schematic side elevational view showing the assembled state of the apparatus shown in FIG. 2;

FIG. 8 is a plan view partially fragmentarily showing a specific structure for a temporary engagement means for the first embodiment;

FIG. 9 is a plan view partially fragmentarily showing another structure of the temporary engagement means;

FIG. 10 is a plan view partially fragmentarily showing still another structure of the temporary engagement means;

DESCRIPTION OF THE PREFERRED EMBODIMENTS

Figure 5A:
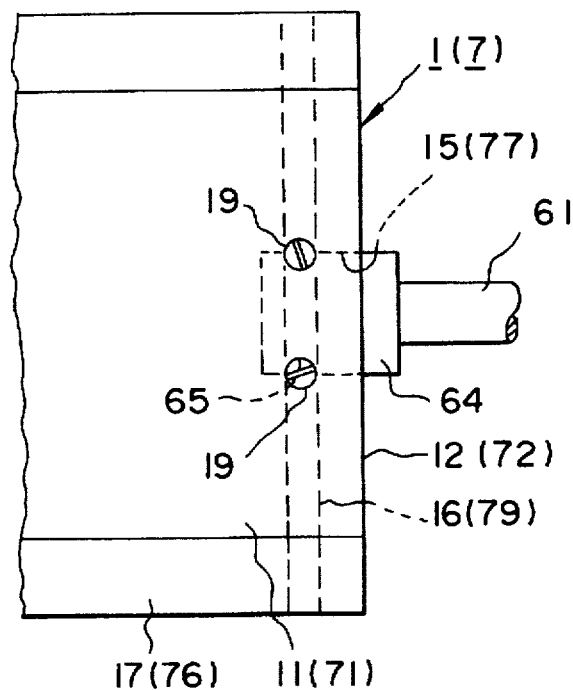
FIGS. 5(A) and 5(B) show a coupling structure between a wedge-shaped drive member or an auxiliary wedge-shaped member and a drive rod, FIG. 5(A) being a plan view showing a primary part thereof, and FIG. 5(B) being a partially fragmentary side elevational view showing the primary part.

The present invention will now be described in detail with reference to the accompanying drawings. FIGS. 1 and 2 show a first embodiment of a multistage wedge-shaped jack apparatus according to the invention. FIGS. 3 and 4 show a second embodiment of the multistage wedge-shaped jack apparatus according to the invention. In these figures, reference numeral 1 denotes a wedge-shaped drive member; 2, a wedge-shaped pressure receiving member; 3, a base plate; 4, a plate-like pedal; 5, a reactive force receiving means; 6, a push/pull drive means; 7, an auxiliary wedge-shaped member; 8, a temporary engagement or stop means; and 9, a stop means.

The basic structure of the multistage wedge-shaped jack according to the present invention includes a wedge-shaped drive member 1 which has a slant surface 11 at least on its upper side and which is movable in the longitudinal direction, and a wedge-shaped pressure receiving member 2 which has, on its one side, a slant surface 21 at the same slant angle along with the slant surface 11 of the above-described wedge-shaped drive member 1 and which has, on the other side, a horizontal surface 22. The wedge-shaped drive member 1 and the wedge-shaped pressure receiving member 2 are brought into contact with each other along the slant surfaces 11 and 21 to form a laminate on a base plate 3. Furthermore, a plate-like pedal 4 is laid on the laminate. A portion on the end face 12, with a larger thickness, of the above-described wedge-shaped drive member 1 is pushed and pulled by a push/pull drive means 6 which is provided in cooperation with a reactive pressure receiving means 5 for limiting a movement of the above-described wedge-shaped pressure receiving member 2. Thus, the structure A laid on the plate-like pedal 4 is jacked up and down.

In addition, the basic structure includes a single or a plurality of auxiliary wedge-shaped members 7 which may be detachably connected in order with the portion having the larger thickness of the above-described drive member 1. Each auxiliary wedge-shaped member 7 has a slant surface 71 having the same slant angle as that of the slant surface 11 of the above-described wedge-shaped drive member 1. The slant surface 11 of the wedge-shaped drive member 1 is continuous with the slant surface 71 of the auxiliary wedge-shaped member at the end face 12 having the larger thickness of the wedge-shaped drive member 1. Also, the slant surface 71 of the auxiliary wedge-shaped member 7 is continuous with the slant surface 71 of the other auxiliary wedge-shaped member 7 at the end face 73 of the auxiliary wedge-shaped member 7 on the rear side. Furthermore, a tip end of a drive rod 61 of the above-described push/pull drive means 6 is connectable to the wedge-shaped drive member 1 and each of the wedge-shaped members 7 on its larger thickness end face. A temporary engagement means 8 is provided for engaging with side faces 13 and 74 of the wedge-shaped drive member 1 and the auxiliary members 7 for limiting the movement thereof through a predetermined jack height.

In the following description, in the case where it is necessary to specify the order of the auxiliary wedge-shaped members 7, the auxiliary wedge-shaped members 7 are referred to by reference characters 7a, 7b, . . . in order from the front side to the rear side. Thus, in this case, suffixes a, b, . . . are added also to each component of the auxiliary wedge-shaped member 7.

The first embodiment of the invention shown in FIGS. 1 and 2 is drawn to a structure in which the wedge-shaped pressure receiving member 2 is laminated on a top of the wedge-shaped drive member 1. The second embodiment of the invention shown in FIGS. 3 and 4 is drawn to another structure in which wedge-shaped pressure receiving members 2, 2 are laminated on an upper portion and a lower portion of the wedge-shaped drive member 1. In the latter case, the upper wedge-shaped pressure receiving member 2 is referenced by the upper wedge-shaped pressure receiving member 2a and the lower wedge-shaped pressure receiving member 2 is referenced by the upper wedge-shaped pressure receiving member 2b for distinction.

First of all, the first embodiment will be explained in detail. In this embodiment, the wedge-shaped drive member 1 has a slant surface 11 on its upper side and a horizontal surface 14 on its lower side. A connection hole 15 is formed on a central portion of a larger thickness end face 12. At the same time, a coupling groove 16 having substantially the T-shape in cross section extending in the lateral direction is formed thereat. Furthermore, guide linear recesses 17, 17 are formed along both sides of the above-described slant surface 11. A pair of stop holes 18, 18 each of which communicates with associated side of the above-described connection hole 15 are formed from the top surface of the wedge-shaped drive member 1. A connection pin 19 may be threadedly engaged into the associated hole 18 from above.

The above-described wedge-shaped pressure receiving member 2 has a slant surface 21 having, on its lower side, the same slant angle as that of the slant surface 11, and has on its upper side, a horizontal surface 22. At the same time, guide linear projections 23, 23 are formed for engaging with the above-described guide recesses 17 along both sides of the above-described slant surface 21.

Also, in order to facilitate the sliding movement of the wedge-shaped drive member 1 relative to the above-described wedge-shaped pressure receiving member 2, it is desirable to embed sliding plates made of stainless steel or a tetrofluoroethylene resin. In order to lay slidably the above-described plate-like pedal 4 slidably on the horizontal surface 22 of the wedge-shaped pressure receiving member 2, it is also preferable to embed the sliding plates in the same manner. However, if the sliding movement would be easy between each slant surface and the component, it is possible to dispense with any sliding plate.

Principally, the above-described wedge-shaped drive member 1 and the wedge-shaped pressure receiving member 2 may be made of steel. However, the work required for delivery and workability, it is of course preferable to use a material that is much lighter in weight. It is therefore possible to recommend to use a synthetic resin compound material, titanium and the like. As the synthetic resin compound material, it is more preferable to use a laminate made of special fiber impregnated with phenol resin because its strength and hardness are high. This laminate is made from a block which is produced by a basic material, made of cloth of special fiber, with resin liquid which is mixed and reacted with phenol, hormaldehyde and special additives within a reactive container, dried and then cut into a predetermined length, laminated and pressurized by a molding press. After the block has been formed a predetermined shape, its sliding surface is subjected to a paraffine process to form the above-described respective components. With respect to the physical property of the material, the specific weight is 1.39, and the hardness is 98 HRM. Also, with respect to the mechanical property, the compression strength is 25.3 kgf/mm$^2$ in the laminate direction (hereinafter referred to as a vertical direction) and is 14.9 kgf/mm$^2$ in the direction along the cloth (hereinafter referred to as a horizontal direction, the bending strength is 13.0 kgf/mm$^2$ in the vertical direction and 14.3 kgf/mm$^2$ in the horizontal direction, the collision value is 45.2 kgf.cm$^2$ in the vertical direction and the 24.9 kgf.cm/cm$^2$ in the horizontal direction, and the amount of wear is 0.02 mm/hr (in case of the test condition of pressure P=60 kg/cm$^2$ and sliding speed V=1 m/s). Incidentally, these characteristic parameters are at a temperature of 20° C.

The above-described base plate 3 is made of stainless steel, and is used to support the horizontal surface of the above-described wedge-shaped drive member 1 and to allow the latter to move in the longitudinal direction. Also, in order to limit the lateral movement of the above-described wedge shaped drive member, it is possible to form projecting guide plates on both sides of the base plate 3.

The above-described pedal plate 4 is composed of a top plate 41 made of metal and laid directly on a horizontal surface 22 of the wedge-shaped pressure receiving member 2 and a rubber pad 42 made of neoprene rubber, etc. laminated thereon in this embodiment. On the top surface of the rubber pad 42 is disposed the structure A. The rubber pad 42 serves as an absorber to any vibration and horizontal rotation of the structure A after the jack-up operation.

The above-described reactive force receiving means 5 is formed as follows. Both side portions of a reactive force receiving member 51 to which a body portion 62 of the push/pull drive means 6 is connected are coupled by reactive force receiving rods 52, 52 with both side portions of the above-described wedge-shaped pressure receiving member 2 on the side of the thin side end face 24. The above-described reactive force receiving member 51 is fixed to one end portion in the longitudinal direction of the above-described base plate 3. In more detail, the reactive force receiving member 51 is so constructed that support plates 54, 54 are fixedly secured to both end portions of a fixed plate 53 arranged perpendicular to the longitudinal direction of the base plate 3, and a thread hole 55 is formed for mounting the body portion 62 of the push/pull drive means 6 on the above-described fixed plate 53. In addition, longitudinal holes 56, 56 are formed in the above-described support plates 54, 54. One end of each of the above-described reactive force receiving rods 52 is pivoted by a pivot pin 57 to be rotatable and movable up and down within the associated longitudinal hole 56. The other end of each of the reactive force receiving rod 52 is pivoted to be rotatable about a pivot pin 58 relative to the above-described wedge-shaped pressure receiving member. Then, the fixed plate 53 and the support plates 54, 54 are welded to the top surface of the above-described base plate 3.

Figure 5B:
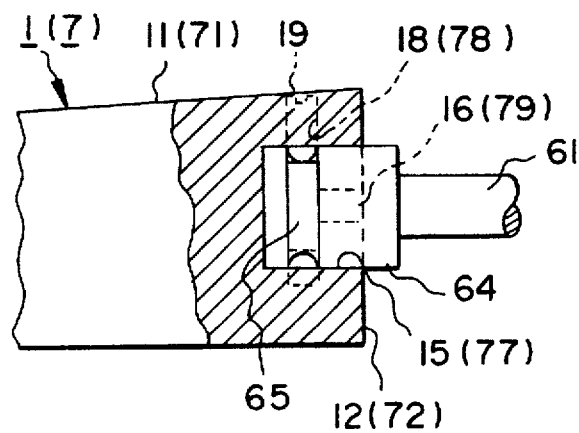

In this embodiment, the above-described push/pull drive means 6 is constituted by a hydraulic jack or cylinder. A male screw portion 63 projecting from one end of the body portion 62 may be threadedly fixed to the thread hole 55 of the above-described fixed plate 53. The above-described drive rod 61 is projected from and retracted into the center of the male screw portion 63 by the hydraulic control. A connector 64 is fixed to a tip end of the drive rod 61. In this embodiment, if the above-described male screw portion 63 is formed by a square screw and parts of the square screw are cut in an axial direction to form a plurality of longitudinal grooves, whereas the above-described thread hole 55 is formed in the same manner and screw portions are left only to the parts corresponding to the longitudinal grooves, it is very practically convenient because the screw portions may readily be engaged with each other through a small amount of rotation after the male screw 63 is inserted into the thread hole 55. The connector 64 has a shape such that it may be inserted into the connection hole 15 of the above-described wedge-shaped drive member 1. An annular groove 65 is formed in an outer circumference of the connector 64. As shown in FIGS. 5(I) and 5(II), under the condition that the connector 64 is inserted into the connection hole 15, if connection pins 19, 19 are inserted into the above-described stop holes 18, 18, parts of the connections pins 19 are engaged with the annular groove 65 so that the drive rod 61 is engaged with the wedge-shaped drive member 1 and prevented from being pulled away from the wedge-shaped drive member 1. In other words, in accordance with the push/pull movement of the drive rod 61, the wedge-shaped drive member 1 is moved integrally therewith. However, in the case where the drive rod 61 is pushed, it is unnecessary to connect the connector 64 with the wedge-shaped drive member 1 by the connection pins 19. This connection is effective for the pull operation thereof.

Figure 6:
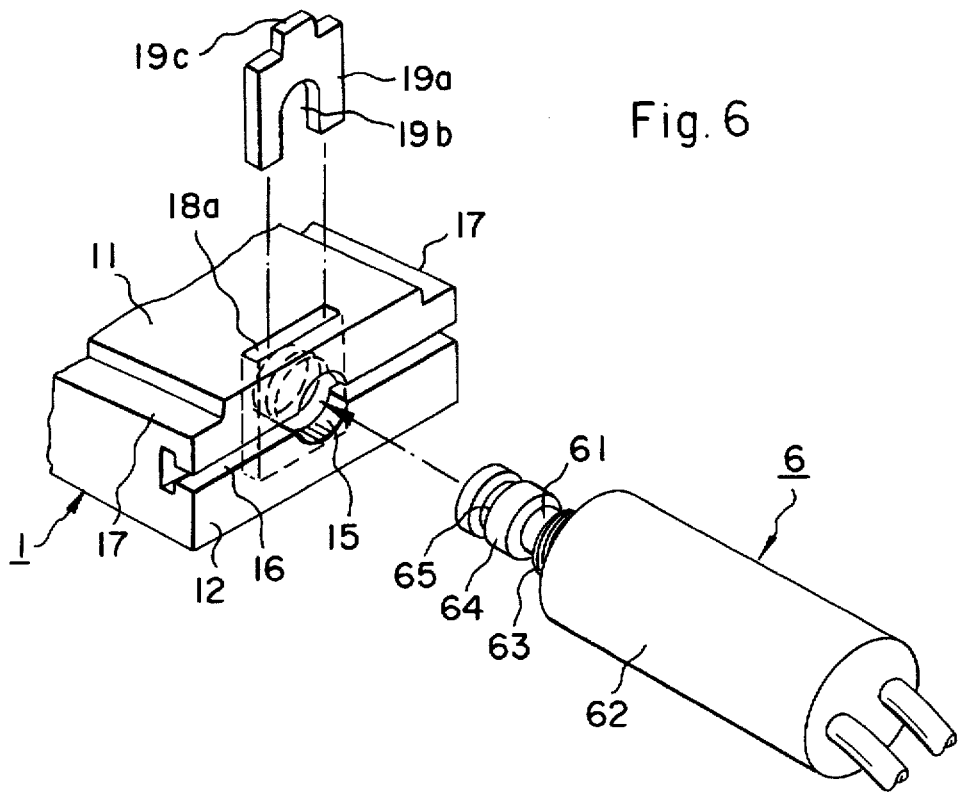
FIG. 6 is a schematic view showing another example of a coupling structure between a wedge-shaped drive member or an auxiliary wedge-shaped member and a drive rod.
Figure 7A:
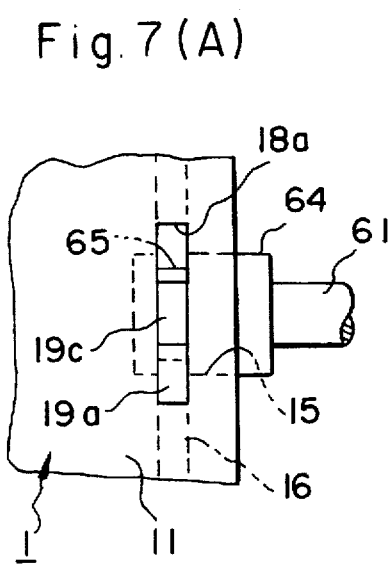
FIGS. 7(A) and 7(B) show a similar coupling structure, FIG. 7(I) being a plan view showing a primary part thereof, and FIG. 7(II) being a partially fragmentary side elevational view showing the primary part.
Figure 7B:
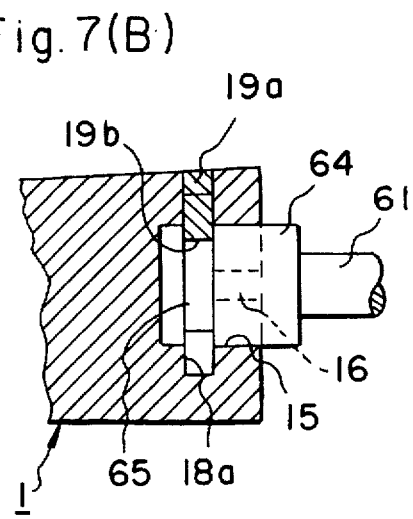
Figure 11:
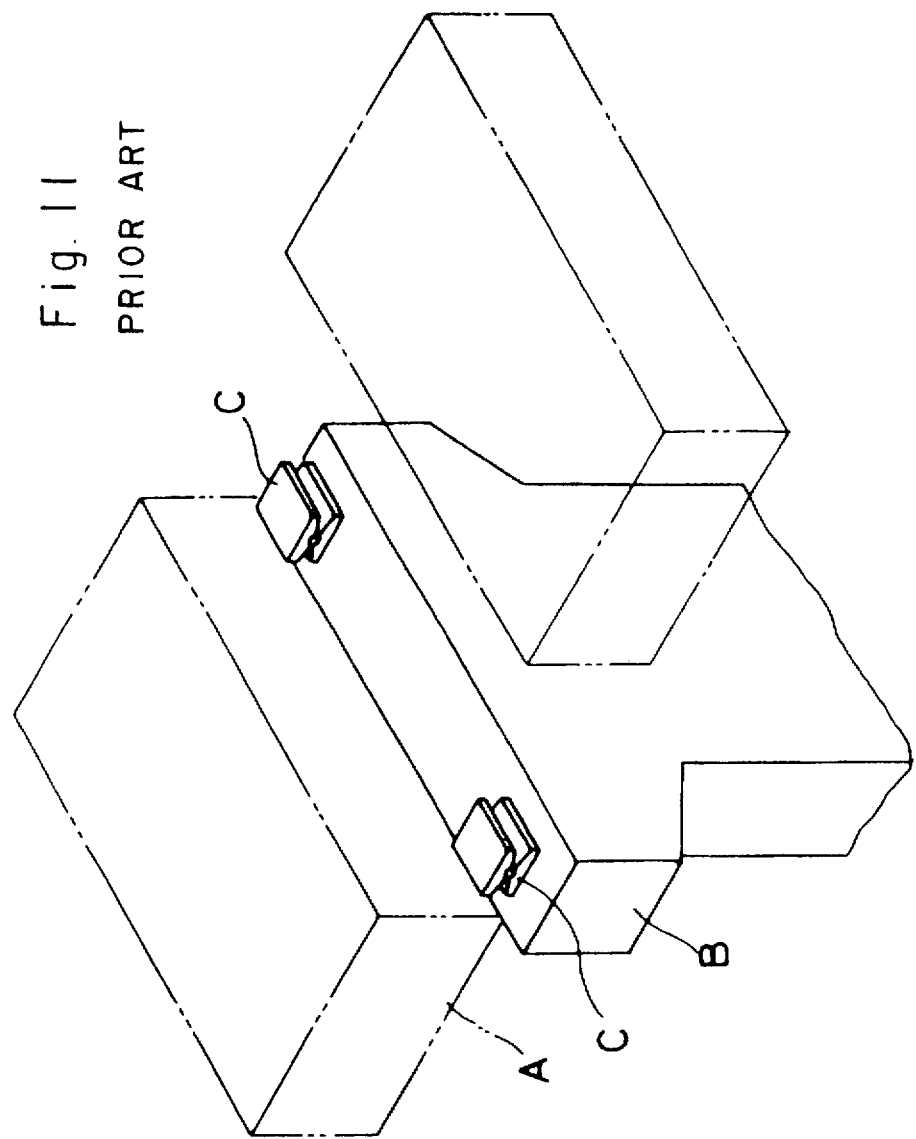
FIG. 11 is an illustration of a conventional condition where a heavy structure (bridge girder) is supported by a lower base (bridge leg)
Figure 12:
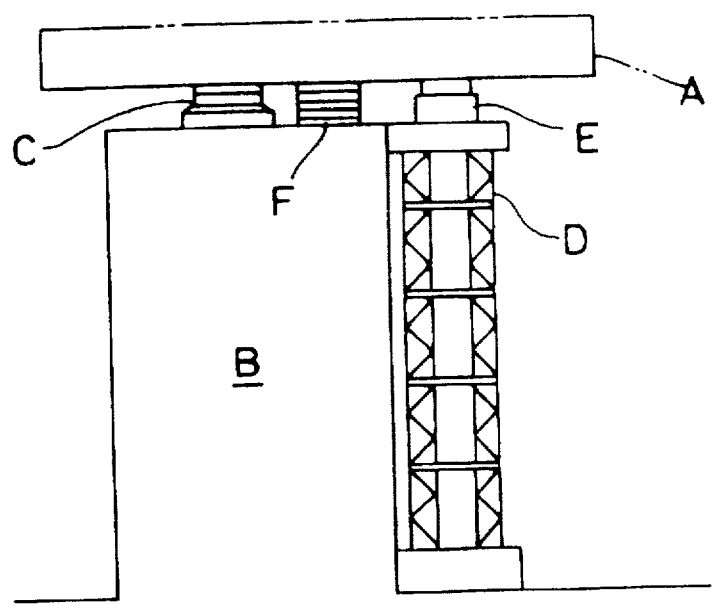
FIG. 12 is an illustration of an example of a method and an apparatus for replacing bearings in accordance with the conventional technology.
Figure 13A:
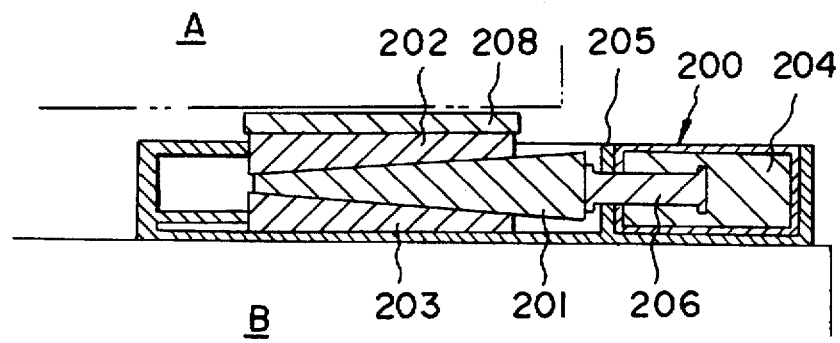
FIGS. 13(A), 13(B) and 13(C) are cross-sectional views showing the conventional wedge-shaped jack apparatus, FIG. 13(A), 13(B) and 13(C) showing an assembled condition, a jack-up condition, and a jack-up and maintenance condition, respectively.
Figure 13B:
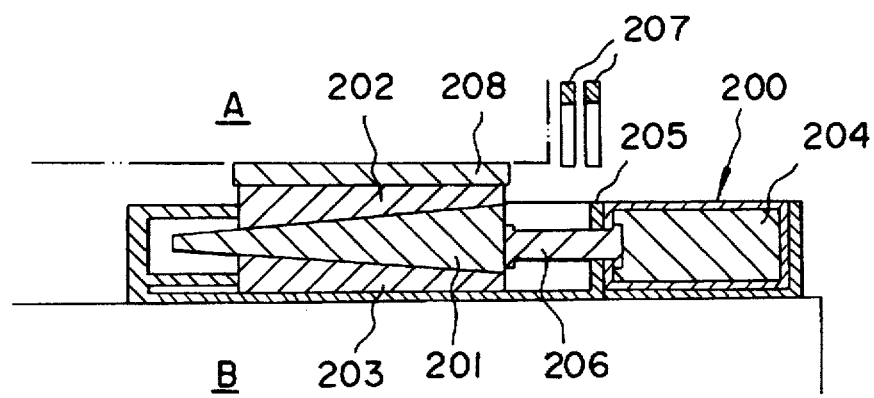
Figure 13C:
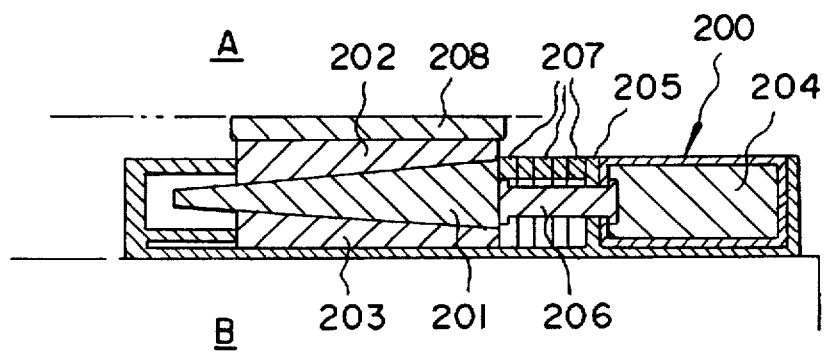

Another connection structure for the above-described wedge-shaped drive member 1 and the drive rod 61 is shown in FIG. 6 and FIGS. 7(I) and 7(II). In this example, a slit hole 18a having a rectangular shape in plan view is formed from the top surface of the wedge-shaped drive member 1 so as to be perpendicular to the deep portions of the above-described connection hole 15 and the connection groove 16. With the connector 64 being inserted into the connection hole 15, a connection plate 19a having an rectangular outer appearance is inserted from above the slit hole 18a. A U-shaped groove 19a formed from a center to a lower end of the connection plate 19a is engaged with the above-described annular groove 65. Also, it is preferable that a projection 19c be formed at the top end of the connection plate 19a for the easy insertion into the slit hole 18a. Incidentally, the same connection structure may be used for the auxiliary wedge-shaped members 7.

The above-described auxiliary wedge-shaped members 7 are made of the same material as the above-described wedge-shaped member 1. As described above, the single or plural auxiliary wedge-shaped members 7 may be detachably engaged with the thick end face 12 of the above-described wedge-shaped member 1 in order. A length of the auxiliary wedge-shaped members 7 is shorter than a stroke of the drive rod 61 of the above-described push/pull drive means 6. A width thereof is the same as the above-described wedge-shaped drive member 1. The auxiliary wedge-shaped members 7 have the top slant surface 71 at the same slant angle as that of the slant surface 11 of the above-described wedge-shaped drive member 1, and the horizontal surface 75 at the bottom. Guide linear recesses 76, 76 to be engaged with the above-described guide linear projections 23, 23 are formed along both sides of the above-described slant surface 71. The thin end face 73 of the front stage auxiliary wedge-shaped member 7a has the same size in appearance as the thick end face 12 of the above-described wedge-shaped drive member 1. When the two members are coupled with each other, the respective slant surfaces 11 and 71 are made continuous with each other. On the other hand, the thin end face 73 of the next stage auxiliary wedge-shaped member 7b has the same size in appearance as the thick end face 72 of the front stage auxiliary wedge-shaped member 7a. When the two components are coupled with each other, the respective slant surfaces 71, 71 are made continuous with each other. Also, a connection hole 77 having the same size as the above-described connection hole 15 is formed in the central portion of the thick end face 72 of the auxiliary wedge-shaped member 7. Stop holes 78, 78 are opened upwardly in the same manner as the above-described stop holes 18, 18. Connection grooves 79 are formed in the thick end face 72 and the thin end face 73 of the auxiliary wedge-shaped member 7, respectively, in the same manner as the connection groove 16.

Then, in order to couple the above-described wedge-shaped drive member 1 and the auxiliary wedge-shaped member 7a with each other, under the condition that the thin end face 73 of the auxiliary wedge-shaped member 7a is brought into contact with the thick end face 12 of the wedge-shaped drive member 1, both edge portions of an H-shaped spill member 100 are inserted into the connection grooves 16 and 79 from the side. Also, in order to couple the front stage auxiliary wedge-shaped member 7a and the rear stage auxiliary wedge-shaped member 7b with each other, under the condition that the thin end face 73 of the rear stage auxiliary wedge-shaped member 7b is brought into contact with the thick end face 72 of the front stage auxiliary wedge-shaped member 7a, both edge portions of an H-shaped spill member 100 are inserted into the connection grooves 79 and 79 from the side. Then, as described above, the auxiliary wedge-shaped members 7, ... are coupled in order one after another with the wedge-shaped drive member 1. The connector 64 fixed to the tip end of the drive rod 61 in the same manner is connected into the connection hole 77 of the thick end face 72 of the rearmost stage auxiliary wedge-shaped member 7.

The above-described temporary engagement means 8 is used to temporarily limit the rearward movement of the wedge-shaped drive member 1 when the next auxiliary wedge-shaped member 7a is connected thereto under the condition that a predetermined height of the jack up is attained by using the wedge-shaped drive member 1, and also to temporarily limit the rearward movement of the auxiliary wedge-shaped member 7a when the next wedge-shaped drive member 1b under the condition that a predetermined height of the jack up is attained by using the auxiliary wedge-shaped member 7a. Various types of the structures may be considered therefor. However, in this embodiment, as shown in FIGS. 1, 2 and 8, engagement grooves 81 consisting of vertical grooves are formed at positions at a predetermined length away from the thick end faces 12, 72 on both side surfaces 13, 13 of the wedge-shaped drive member 1 and on both side surfaces 74, 74 of the auxiliary wedge-shaped members 7, ... , respectively. Cams 84 are rotatably projected from openings 83 formed at parts of side plates 82, 82 extending upwardly from both sides of the base plate 3 and are engaged with the above-described engagement grooves 81 for preventing the wedge-shaped drive member 1 and the auxiliary wedge-shaped member 7, ... from returning back. The above-described cams 84 are pivoted about vertical shafts disposed within mount members 85 having a U-shape in cross section and having base ends fixed to the outer surfaces of the side plates 82. With the structure of the engagement grooves 81 and the cams 84, after the wedge-shaped drive member 1 or the auxiliary wedge-shaped member 7 is pushed so that the engagement grooves 81 are located to the cams 84, when the drive rod 61 is drawn so that the wedge-shaped drive member 1 or the auxiliary wedge-shaped member 7 is somewhat retracted, the cams 84 are automatically drawn inwardly by steeply stepped portions 81a of the front edges 81a of the engagement grooves 81 for engagement. Under this condition, when the drive rod 61 is pushed so that the wedge-shaped drive member 1 or the auxiliary wedge-shaped member 7 is advanced, the tip ends of the cams 84 are pushed by gently slant surfaces 81b of the engagement grooves 81 so that the cams 84 are rotatably received outwardly automatically for disengagement. Of course, it is possible to normally urge the cams 84 in a direction to project for release.

The above-described stop means 9 is used to prevent the wedge-shaped drive member 1 or the auxiliary wedge-shaped member 7 from returning back in order to stably maintain the condition after the structure A is jacked up at a predetermined height by using the wedge-shaped drive member 1 and the auxiliary wedge-shaped members 7, .... . In this embodiment, the stop means 9 is composed of single or a plurality of stop plates 91, ... to be interposed between the thick end face 12 of the wedge-shaped drive member 1 or the thick end face 72 of the most rear stage of the auxiliary wedge shaped member 7 and the fixed plate 53 of the reactive force receiving member 51. The stop plate 91 is in the form of a horseshoe with a cutaway portion 92 open downwardly in the central portion in order to be mounted to embrace the above-described drive rod 61.

Also, in this embodiment, the wedge-shaped drive member 1 is divided into three segments in the longitudinal direction. Each segments 1a, 1b and 1c are detachably engaged with each other by using the H-shaped spill members 101 in the same manner as described above.

The operation for jacking up the structure A relative to the lower base B by using the multistage wedge-shaped jack apparatus according to the present invention will now be described. First of all, the wedge-shaped pressure receiving member 2 is laminated on the wedge-shaped drive member 1 with the slant surface 21 in contact with the slant surface 11. At the same time, the horizontal surface 14 of the wedge-shaped drive member 1 is laid on the base plate 3. The reactive force receiving rods 52, 52 are pivoted on both sides of the wedge-shaped pressure receiving member 2. The male thread portion 63 of the body portion 62 of the push/pull drive means 6 is threadedly engaged with the thread hole 55. At the same time, the connector 64 fixed to the tip end of the drive rod 61 is inserted into the connection hole 15 of the thick end face 12 of the wedge-shaped drive member 1. A condition is kept in that the wedge-shaped drive member 1 is closest to the fixed plate 53. Under the condition that the plate-like pedal 4 is laid on the horizontal surface 22 of the wedge-shaped pressure receiving member 2, the base plate 3 is set horizontally on the lower base B so that the structure A is positioned in a predetermined position.

Then, the push/pull drive means 6 is hydraulically driven to push the wedge-shaped drive member 1 on the thick end face 12 to gradually enter below the wedge-shaped member 2 by the drive rod 61. In accordance with the sliding movement of the respective slant surfaces 11 and 21, the wedge-shaped pressure receiving member 2 and the plate-like pedal 4 are raised, thereby jacking up the structure A. In this case, since one side ends of the reactive force receiving rods 52 are pivoted at the longitudinal holes 56, the pivot pins 57 are raised along the longitudinal holes 56 in accordance with the elevation of the wedge-shaped pressure receiving member 2, and the reactive force receiving rods 52 are always kept in the horizontal position to stably receive the reactive forces to thereby limit the movement of the wedge-shaped pressure receiving member 2. Thereafter, when the push movement of the wedge-shaped drive member 1 reaches the final stage, the above-described cams 84 are located in the engagement grooves 81. Then, the drive rod 61 is retracted rearwardly so that the connector 64 is removed from the connection hole 15. Furthermore, the connector 64 is retracted rearwardly up to the position of the fixed plate 53. Under this condition, in the case where the wedge-shaped drive member 1 is abruptly moved rearwardly, the cams 84 are engaged with the engagement grooves 81 to prevent the wedge-shaped drive members 1 from returning back. Also, the engagement holes 18 are exposed on the thin end face 24 side of the wedge shaped pressure receiving member 2. Then, under the condition that the first stage auxiliary wedge-shaped member 7a is located on the base plate 3 between the thick end face 12 of the wedge-shaped drive member 1 and the connector 64, and the thick end face 12 of the wedge-shaped drive member 1 is jointed with the thin end face 73 of the auxiliary wedge-shaped member 7a, the H-shaped spill member 100 is inserted into the connection grooves 16 and 79. In this case, the segment 1a of the wedge-shaped drive member 1 which has passed through the thick end face 25 of the wedge-shaped pressure receiving member 2 may be removed by removing the H-shaped spill member 101.

When the drive rod 61 of the push/pull drive means 6 is advanced, after the connector 64 is inserted into the connection hole 77 of the auxiliary wedge-shaped member 7b, the auxiliary wedge-shaped member 7a is pushed below the wedge-shaped pressure receiving member 2, and the wedge-shaped pressure receiving member 2 is raised by the sliding movement of the respective slant surfaces 71 and 21 in the same way to thereby further jack up the structure A. Thereafter, almost all of the auxiliary wedge-shaped member 7a is pushed below the wedge-shaped pressure receiving member 2. When the cams 84 are located at the position corresponding to the engagement grooves 81 of the auxiliary wedge-shaped member 7a, the drive rod 61 is again moved rearwardly and the connector 64 is removed from the connection hole 77 and moved close to the fixed plate 53. In this case, the cams 84 are engaged with the engagement grooves 81 by the rearward movement of the auxiliary wedge-shaped member 7a in the same way. Under this condition, the next auxiliary wedge-shaped member 7b is laid between the thick end face 72 of the auxiliary wedge-shaped member 7a and the connector 64. Both components are coupled with each other by the H-shaped spill member 100. In this case, the segment 1b of the wedge-shaped drive member 1 which has passed through the thick end face 25 of the wedge-shaped pressure receiving member 25 may be removed.

When the drive rod 61 of the push/pull drive means 6 is advanced, after the connector 64 has been inserted into the connection hole 77 of the auxiliary wedge-shaped member 7a, the auxiliary wedge-shaped member 7b is pushed below the wedge-shaped pressure receiving member 2, and the wedge-shaped pressure receiving member 2 is raised in the same way to thereby raise the structure A. Thus, the auxiliary wedge-shaped members 7, . . . are fed one by one. The structure A is further jacked up. Each member which has passed through the thick end face 25 of the wedge-shaped pressure receiving member 2 is repeatedly removed. Finally, after the structure A is jacked up at a predetermined height, the stop members 91, . . . are inserted as the stop means between the thick end face 72 of the final stage auxiliary wedge-shaped member 7 and the fixed plate 53 of the pressure receiving member 51, and the complete rearward movement prevention is effected for the auxiliary wedge-shaped member 7 to maintain the jack-up condition.

On the other hand, the structure A which has been jacked up at the predetermined height will be jacked down as follows. Under the condition that the connector 64 at the tip end of the drive rod 61 is engaged with the connection hole 77 of the final stage auxiliary wedge-shaped member 7, the connection pins 19 and 19 are threadedly engaged from above with the stop holes 78 and 78 of the auxiliary wedge-shaped member 7. The intermediate portions of the connection pins 19, 19 which project partially into the connection hole 77 are engaged with the annular groove 65 of the connector 64 for preventing the connector 64 from pulling away. At the same time, the stop plates 91, . . . are removed. The H-shaped spill member 100 is inserted into the connection grooves 79, 79 from the side on the thin end face 73 side of the auxiliary wedge-shaped member 7 of the front stage projecting from the thick end face 25 of the wedge-shaped pressure receiving member 2 and on the thick end face 72 of the wedge-shaped member 7 corresponding to its front stage, or the segment 1c of the wedge-shaped drive member 1 is connected. Thereafter, while releasing the temporary engagement means 8, the drive rod 61 is retracted, and the final stage auxiliary wedge-shaped member 7 is pulled away from the thin end face 24 side of the wedge-shaped pressure receiving member 2 to thereby jack down the structure A. Then, under the condition that the cams 84 of the temporary engagement means 8 are rotated and engaged with the engagement grooves 81, if necessary, the connection pins 19, 19 are removed, and the H-shaped spill member 100 is removed to keep a release condition. In this condition, the drive rod 61 is further retracted and the connector 64 is pulled away from the connection hole 77. The final stage auxiliary wedge-shaped member 7 is removed. These operations are repeated to thereby jack down gradually the structure A.

A second embodiment of the present invention will now be described with reference to FIGS. 3 and 4. In this embodiment, the wedge-shaped drive member 1 is made symmetric up and down. Slant surfaces 11, 11 are formed on the top and bottom surfaces, and the guide linear recess 17, 17 are formed along both sides of each slant surface 11. In correspondence with this, also, the wedge-shaped pressure receiving member 2 is composed of a pair of upper wedge-shaped pressure receiving member 2a and the lower wedge-shaped pressure receiving member 2b. The upper wedge-shaped pressure receiving member 2a is substantially the same as that of the first embodiment. The lower wedge-shaped pressure receiving member 2b is made by forming it up side down. The slant surface 21 formed on the lower surface of the upper wedge-shaped pressure receiving member 2a is brought into contact with the upper slant surface 11 of the wedge-shaped drive member 1, and the slant surface 21 formed on the upper surface of the lower wedge-shaped pressure receiving member 2b is brought into contact with the lower slant surface 11 of the wedge-shaped pressure receiving member 2. Under this condition, the horizontal surface 22 of the lower wedge-shaped pressure receiving member 2b is laid on the base plate 3, and the above-described plate-like pedal 4 is laid on the horizontal surface 22 of the upper surface of the upper wedge-shaped pressure receiving member 2a.

Also, the following reactive force receiving means 5 is used in this embodiment. A reactive force receiving member 51 has support plates 54, 54 fixed to a fixed plate 53 on both sides. A screw hole 55 is formed in a fixed plate 53. On end portions of similar four reactive force receiving rods 52 are pivoted about the upper and lower portions of each support plate 54 by pivot pins 57, 57, respectively. The other end portions are pivoted by pivot pins 58, . . . on both sides close to the thin end faces 24 of the associated wedge-shaped pressure receiving members 2a, 2b. In this case, it is preferable that the reactive force receiving plate 51 is not fixed to the base plate 3.

Also, the following temporary engagement means 8 is used in this embodiment. Vertical cutaway grooves 86 are formed at positions close to the thick end face 12 in the side wall 13 of the above-described wedge-shaped drive member 1. The similar cutaway grooves 87, 87 are formed in the side wall on the thin end face 24 side of the upper and lower wedge-shaped pressure receiving members 2a, 2b. Central portions of limit plates 88 are fixed to the above-described cutaway grooves 86 by suitable fastening means such as bolts 89. The upper and lower end portions of the limit plates 88 are engaged with the cutaway grooves 87, 87 of the upper and lower wedge-shaped pressure receiving members 2a, 2b to thereby limit the movement of the wedge-shaped drive member 1 relative to the upper and lower wedge-shaped pressure receiving members 2a, 2b.

In this embodiment, the auxiliary wedge-shaped members 7, . . . are tapered with the slant surfaces 71, 71 on the upper and lower surfaces in the same manner as the above-described wedge-shaped drive member 1. The cutaway grooves 86, 86 are formed on both side surfaces 74, 74 on the thick end face 72 side in the same manner as described above. Accordingly, when the structure is jacked by using the wedge-shaped member 7, the above-described limit plates 88 are fixed to the cutaway grooves 86 of the auxiliary wedge-shaped member 7, and the upper and lower end portions thereof are engaged with the cutaway grooves 87, 87 of the upper and lower wedge-shaped pressure receiving members 2a, 2b for the temporary engagement.

The other structure of the multistage jack apparatus according to the second embodiment is the same as that of the first embodiment. Accordingly, the same reference numerals are used to denote the same components. The duplication of explanation therefor will be avoided. The method for use is the same, and hence its operation will be omitted. However, if the slant angles of the slant surfaces 11, 21, 71 of the respective members are the same as that of the first embodiment, in this embodiment, even if the amount of shift of the wedge-shaped drive member 1 by the push/pull drive means 6 is the same, the jack shift amount may be doubled. Also, in this embodiment, since the pressure receiving means 5 is not fixed to the base plate 3, if the horizontal drive force is applied to the structure A after the jack operation, it is possible to move the upper and lower wedge-shaped pressure receiving members 2a, 2b integrally together with the structure A along the upper surface of the base plate 3. Accordingly, this system may be used also to return, back to the original location, the structure A which has been replaced laterally due to earthquakes or the like.

Another structure for the above-described temporary engagement means 8 may be used as shown in FIGS. 9 and 10. FIG. 9 shows a structure for preventing the return movement of the wedge-shaped drive member 1 and the auxiliary wedge-shaped members 7, . . . , in which engagement grooves 81 are formed on both side surfaces 13, 13 of the wedge-shaped drive member 1 and both side surfaces 74, 74 of each auxiliary wedge-shaped member 7, . . . . Engagement claws 84a are slidingly inwardly projected from openings 83a formed in parts of the side plates 82, 82 formed upright on both sides of the base plate 3 and engaged with the engagement grooves 81. Here, the above-described engagement claws 84a are disposed to be slidable within a mount members 85 having a U-shape in cross section and having base portions fixed to the outer surfaces of the side plates 82. The structure of the engagement grooves 81 and the engagement claws 84a is as follows. After the wedge-shaped drive member 1 or the auxiliary wedge-shaped member 7 is pushed by the drive rod 61 and the engagement grooves 81 reaches the position of the engagement claws 84a, the engagement claws 84a are projected by coil springs 84b interposed between the engagement claws 84a and the inner surfaces of the mount members 85. As a result, the engagement claws 84a are engaged with the engagement grooves 81. In this case, the steeply stepped portions 81a at the front edges of the engagement grooves 81a are retained at the engagement claws 84a. Also, in this condition, when the drive rod 61 is pushed to advance the wedge-shaped drive member 1 or the auxiliary wedge-shaped member 7, the tip ends of the engagement claws 84a are pushed outwardly by the gentle slant surfaces 81b of the engagement grooves 81 to thereby release the engagement. Inversely, in the case where the wedge-shaped drive member 1 or the auxiliary wedge-shaped member 7 is withdrawn by the drive rod 61, operating shafts 84c which pass through the mount members 85 and which are fixed to the engagement claws 84a are withdrawn and the engagement claws 84a are slidingly moved outwardly against the spring force of the coil springs 84b to attain the disengagement from the engagement grooves 81.

In the temporary engagement means shown in FIG. 10, a through-hole 83b is formed in each of the above-described side plates 82, and an engagement pin 84d is detachably inserted from the outside into the through-hole 83b. The engagement pin 84d is inserted into one of single or a plurality of retainer holes 81c formed along the movement direction in the side wall of the wedge-shaped drive member 1 or the auxiliary wedge-shaped member 7 to thereby attain the prevention of return movement of the wedge-shaped drive member 1 or the auxiliary wedge-shaped member 7.

With the thus explained multistage wedge-shaped jack apparatus according to the present invention, it is possible to jack up smoothly in safety, the heavy weight structure such as a bridge girder in the same manner through a small push/pull drive force as in the conventional jack apparatus and also to considerably increase the jack amount without increasing the overall length of the apparatus.

Various details of the invention may be changed without departing from its spirit nor its scope. Furthermore, the foregoing description of the embodiments according to the present invention is provided for the purpose of illustration only, and not for the purpose of limiting the invention as defined by the appended claims nd their equivalents.

What I claim is:

1. A multistage wedge-shaped jack apparatus comprising:
   a longitudinally movable wedge-shaped drive member with an upper side and a lower side and a thin end face and a thick end face and having a slanted surface, which is slanted at a predetermined angle to a horizontal direction, on at least said upper side of said wedge-shaped drive member;
   a wedge-shaped pressure receiving member with an upper side, a lower side, a thin end face, and a thick end face and having a slanted surface, which is slanted at a same predetermined angle to said horizontal direction as said predetermined angle of said slanted surface of said wedge-shaped drive member, any one of said upper and lower sides of said wedge-shaped pressure receiving member being slidable on said slanted surface of said wedge-shaped drive member, and any one of said upper and lower sides of said wedge-shaped pressure receiving member, which is not slidable on said slanted surface of said wedge-shaped pressure member, having a horizontal surface, wherein said wedge-shaped pressure receiving member is laid on top of said wedge-shaped drive member so that said slanted surface of said wedge-shaped pressure receiving member contacts said slanted surface of said wedge-shaped drive member and said wedge-shaped drive member is laid on a base plate;
   a plate-like pedal is laid on top of said wedge-shaped pressure receiving member which is laid on top of said wedge-shaped drive member;
   said thick end face side of said wedge-shaped drive member is any one of pushed and pulled by a push and pull drive means provided in cooperation with a reactive force receiving means for limiting movement of said wedge-shaped pressure receiving member for jacking up and down a structure laid on said plate-like pedal;
   at least one auxiliary wedge-shaped member is detachably coupled to said thick end face side of said wedge-shaped drive member;
   each of said at least one auxiliary wedge-shaped member has a shorter length than a length of a stroke of said push and pull drive means, and has a slanted surface having said same predetermined angle to said horizontal direction as said predetermined angle of said slanted surface of said wedge-shaped drive member;
   any one of said slanted surfaces of said wedge-shaped drive member and said at least one auxiliary wedge-shaped member are continuous from any one of said thin end face and said thick end face of said wedge-shaped drive member to any one of said thick end face and said thin end face of said at least one auxiliary wedge-shaped member;
   a tip end of a drive rod of said push and pull drive means and said thick end face of said wedge-shaped drive member and each of said at least one auxiliary wedge-shaped member which are detachably coupled thereto; and
   a temporary engagement means for limiting movement of said wedge-shaped drive member and said at least one auxiliary wedge-shaped member in engagement with side walls of said wedge-shaped drive member and said at least one auxiliary wedge-shaped members after a jack-up operation through a predetermined height.

2. The multistage wedge-shaped jack apparatus according to claim 1, wherein said wedge-shaped drive member and said at least one auxiliary wedge-shaped member each have said slanted surface on said upper side thereof and a horizontal surface on said lower side thereof, and said wedge-shaped pressure receiving member located on said upper side of said wedge-shaped drive member has said slanted surface on said lower side thereof.

3. The multistage wedge-shaped jack apparatus according to claim 1 or 2, wherein said reactive force receiving means for coupling, through links, both side portions of pressure receiving members to which a body portion of said push and pull drive means is fixed and both side portions of said wedge-shaped pressure receiving member at positions close to said thin end face thereof, and said reactive force receiving member is fixed to said base plate.

4. The multistage wedge-shaped jack apparatus according to claim 3, wherein at least one stop plate is inserted between said reactive force receiving means and any one of said thick end face of said wedge-shaped drive member and said at least one auxiliary wedge-shaped member.

5. The multistage wedge-shaped jack apparatus according to claim 1, wherein said wedge-shaped drive member and said at least one auxiliary wedge shaped member have said slanted surfaces on said upper and lower sides, said wedge-shaped pressure receiving member located on said lower side of said wedge-shaped drive member has said slanted surface on said upper side thereof and said wedge-shaped pressure receiving member located on said upper side of said wedge-shaped drive member has said slanted surface on said lower side.

6. The multistage wedge-shaped jack apparatus according to claim 1 or 5, wherein said reactive force receiving means for coupling, through links, both side portions of pressure receiving members to which a body portion of said push and pull drive means is fixed and both side portions of said upper and lower wedge-shaped pressure receiving members at positions closest to said thin end faces thereof.

7. The multistage wedge-shaped jack apparatus according to claim 6, wherein at least one stop plate is inserted between said reactive force receiving means and any one of said thick end face of said wedge-shaped drive member and said at least one auxiliary wedge-shaped member.

8. The multistage wedge-shaped jack apparatus according to claim 1, wherein said wedge-shaped drive member and said at least one auxiliary wedge-shaped member are coupled with each other by inserting one-half of an H-shaped spill member into connection grooves having T-shaped cross-sections formed in said thin and thick end faces of said wedge-shaped drive member and said at least one auxiliary wedge-shaped member.

9. The multistage wedge-shaped jack apparatus according to claim 1, wherein guide linear recesses are formed along both sides of any one of said slanted surfaces of said wedge-shaped drive member and said wedge-shaped pressure receiving member that are slidingly moved relative to each other, and guide linear projections which slidably contact said linear recesses, said guide linear projections being formed on any one of said slanted surfaces of said wedge-shaped drive member and said wedge-shaped pressure receiving member not having said guide linear recess.

10. The multistage wedge-shaped jack apparatus according to claim 1, wherein at least one stop plate is inserted between said reactive force receiving means and any one of said thick end face of said wedge-shaped drive member and said at least one auxiliary wedge-shaped member.

11. The multistage wedge-shaped jack apparatus according to claim 1, wherein said wedge-shaped drive member is divided into a plurality of segments in a longitudinal direction, and said segments are detachably coupled to each other.

* * * * *